US012798829B2

(12) United States Patent
Haubner et al.

(10) Patent No.: US 12,798,829 B2
(45) Date of Patent: Nov. 17, 2026

(54) WOOD-PLASTIC COMPOSITE MATERIAL

(71) Applicant: Alexander Haubner, Linz (AT)

(72) Inventors: Alexander Haubner, Linz (AT); Christoph Burgstaller, Wels (AT)

(73) Assignee: Alexander Haubner, Linz (AT)

( * ) Notice: Subject to any disclaimer, the term of this patent is extended or adjusted under 35 U.S.C. 154(b) by 452 days.

(21) Appl. No.: 18/018,002

(22) PCT Filed: Jun. 21, 2021

(86) PCT No.: PCT/AT2021/060214

§ 371 (c)(1),
(2) Date: Jan. 25, 2023

(87) PCT Pub. No.: WO2022/020868

PCT Pub. Date: Feb. 3, 2022

(65) Prior Publication Data

US 2023/0271751 A1 Aug. 31, 2023

(30) Foreign Application Priority Data

Jul. 27, 2020 (AT) .............................. A 50640/2020

(51) Int. Cl.

| | |
|---|---|
| ***C08L 97/02*** | (2006.01) |
| ***B29C 48/00*** | (2019.01) |
| ***B29C 48/375*** | (2019.01) |
| ***B65D 19/38*** | (2006.01) |
| *B29K 23/00* | (2006.01) |
| *B29K 105/12* | (2006.01) |
| *B29K 311/14* | (2006.01) |
| *B29L 31/00* | (2006.01) |

(52) U.S. Cl.

CPC .......... *B65D 19/38* (2013.01); *B29C 48/0012* (2019.02); *B29C 48/022* (2019.02); *B29C 48/375* (2019.02); *C08L 97/02* (2013.01); *B29K 2023/12* (2013.01); *B29K 2105/12* (2013.01); *B29K 2311/14* (2013.01); *B29K 2995/0063* (2013.01); *B29K 2995/0077* (2013.01); *B29L 2031/7178* (2013.01); *B65D 2519/00029* (2013.01); *B65D 2519/00034* (2013.01); *B65D 2519/00039* (2013.01)

(58) Field of Classification Search

CPC ...................................................... C08L 97/02

See application file for complete search history.

(56) References Cited

U.S. PATENT DOCUMENTS

| | | | | |
|---|---|---|---|---|
| 7,431,872 | B2 | 10/2008 | Dostal et al. | |
| 9,238,731 | B2 | 1/2016 | Cernohaus et al. | |
| 2003/0021915 | A1* | 1/2003 | Rohatgi | C08L 97/02 264/211.23 |
| 2004/0147625 | A1 | 7/2004 | Dostal et al. | |
| 2004/0170818 | A1* | 9/2004 | Stucky | C08J 9/0085 428/304.4 |
| 2008/0214699 | A1* | 9/2008 | Halahmi | C08L 23/06 523/222 |
| 2010/0331458 | A1 | 12/2010 | Cernohaus et al. | |

FOREIGN PATENT DOCUMENTS

| | | | |
|---|---|---|---|
| CN | 108178870 | A | 6/2018 |
| CN | 108192200 | A | 6/2018 |
| CN | 109320816 | A | 2/2019 |
| CN | 106700262 | B | 4/2019 |
| EP | 2247653 | B1 | 1/2009 |
| EP | 2042551 | B2 | 4/2009 |
| WO | 02/088233 | A1 | 11/2002 |
| WO | 2009/095426 | A2 | 8/2009 |

OTHER PUBLICATIONS

Essentra Components, "What's the Difference in LDPE and HDPE?", 2025, p. 1-10; Accessed at https://www.essentracomponents.com/en-us/news/manufacturing/injection-molding/what-s-the-difference-between-ldpe-and-hdpe?srsltid=AfmBOoqvWTZ0AiotEtvxzB3RA491tyjtlv7MdlsD8ilP5HGn3WlEolDU.*

Byk, "SCONA TPPP 8112 GA", 2013, p. 1-2; Accessed at https://www.byk.com/en/products/additive-guide/scona-tppp-8112-ga.*

Industrial Specialties Mfg, "Mesh and Micron Sizes", 2022, p. 1-7; https://marketing.industrialspec.com/acton/attachment/30397/f-0045/1/-/-/-/-/mesh-micron-sizes-chart-ebook-from-ism.pdf.*

(Continued)

*Primary Examiner* — Humera N. Sheikh
*Assistant Examiner* — Julia L Rummel
(74) *Attorney, Agent, or Firm* — Tiajoloff & Kelly LLP

(57) ABSTRACT

Described is a wood-plastic composite material for structural components of transport pallet, said structural components being capable of being nailed together, having a matrix foamed by means of a blowing agent, wood meal fibres and an adhesion promoter. To create a wood-plastic composite material of this kind which enables a cost-efficient production of transport pallets with a wood-like appearance and constitutes a reliable replacement for the soft wood materials used up until now, at least with regard to weight and mechanical strength properties, it is proposed that the matrix, which comprises a long chain-branched polyolefin, has a mass fraction of 30-95%, the wood meal fibres have a mass fraction of 5-50% and the adhesion promoter has a mass fraction of up to 10% of the wood-plastic composite material, the composite material density being less than 0.3 $g/cm^3$.

11 Claims, No Drawings

(56) References Cited

OTHER PUBLICATIONS

Europlas, "Nylon 6: Definition, Properties, and Common Uses", p. 1-10; Accessed at https://web.archive.org/web/20240519224310/https://europlas.com.vn/en-US/blog-1/nylon-6-definition-properties-and-common-uses.*

Special Chem, "Technical Datasheet: Daploy™ WB140HMS", 2019, p. 1-4; Accessed at https://www.specialchem.com/plastics/product/borealis-daploy-wb140hms.*

Espacenet English language abstract for CN106700262 B, Apr. 9, 2019.

Espacenet English language abstract for CN108178870 A, Jun. 19, 2018.

Espacenet English language abstract for CN109320816 A, Feb. 12, 2019.

Espacenet English language abstract for CN 108192200 A, Jun. 22, 2018.

* cited by examiner

WOOD-PLASTIC COMPOSITE MATERIAL

FIELD OF THE INVENTION

The invention relates to a wood-plastic composite material for structural components of transport pallets which can be nailed together, having a matrix, wood meal fibres and an adhesion promoter, wherein the matrix is foamed by means of a blowing agent.

Against the background of sustainable developments and increased resource efficiency, there is a need to manufacture transport pallets based on the Europool standard using a material that is at least comparable or at best superior to the softwood materials used to date in terms of weight, mechanical strength properties, manufacturability and processability as well as cost efficiency, and which material nevertheless has a certain wooden appearance for reasons of customer acceptance. In order to ensure an economical production process of the transport pallets, the corresponding structural components must be able to be nailed together, in particular by means of compressed air or upsetting head nailers, in such a way that no component damage occurs and a reliable function of the transport pallet is made possible.

DESCRIPTION OF THE PRIOR ART

Wood-plastic composite materials, so-called wood-polymer composites (WPC), are known from the prior art (WO 2002088233 A1), which comprise a matrix of high-density polyethylene (PE-HD) foamed by means of a carbon dioxide-based blowing agent, and wood meal fibres. However, such wood-plastic composite materials are not suitable as structural components of the above-mentioned transport pallets due to their relatively brittle nature and their comparatively low fatigue strength, especially as such wood-plastic composites tend to crack due to nailing.

SUMMARY OF THE INVENTION

The invention is thus based on the object of creating a wood-plastic composite material that enables the cost-effective production of transport pallets with a wood-like appearance and, at the same time, represents a reliable substitute for the softwood materials used to date, at least in terms of weight and mechanical strength properties.

The invention solves the given problem in that the matrix, which comprises a long-chain branched polyolefin, has a mass fraction of 30-95%, the wood meal fibres have a mass fraction of 5-50% and the adhesion promoter, which is preferably based on maleic anhydrides, has a mass fraction of up to 10% of the wood-plastic composite material, the composite density being less than 0.3 g/cm$^3$.

Wood meal fibres, preferably with a particle size of 70-150 μm, would basically counteract the formation of a uniform foam structure because there is a risk that the wood meal fibres will pierce any foam cells and thus damage them. Higher mass fractions of up to 50% of the wood meal, which would be conducive to an appealing wood look, are therefore not readily possible. Surprisingly, however, it has been shown that even at high wood meal mass fractions of up to 50%, a uniform foam structure is formed through the use of long-chain branched polyolefins. This enables both low composite densities and comparatively high strength values due to the strain-hardening effects that occur during processing and are favoured by the long-chain branching of the polyolefin. The strain-hardening effects can be demonstrated, for example, by means of uniaxial strain rheology measurements, wherein an increase in viscosity due to the strain load can be detected. For the purposes of the invention, long-chain branching is understood to mean that at least 10% of the side chains of the polyolefin have a chain length of at least 6 carbon atoms. Preferably, the polyolefin is a low-density polyethylene (PE-LD or LDPE) or a polypropylene. Particularly favourable properties as well as high cost efficiency with regard to the use of the wood-plastic composite according to the invention as a structural component for transport pallets result when the density is below 0.2 g/cm$^3$, preferably below 0.1 g/cm$^3$. Furthermore, a wood-plastic composite material according to the invention can have a modulus of elasticity of 500 to 1000 MPa, determined via an ISO-178 bending test at a test speed of 1 mm/s, as well as a flexural strength of at least 7 MPa. Structural components made of the wood-plastic composite material according to the invention are thus suitable for permanently withstanding the loads to which transport pallets are usually subjected. In addition, the wood-plastic composite material has sufficient ductility so that any structural components can be easily nailed together using compressed air or upsetting head nailers in such a way that no dangerous cracks form in the foam structure and no splintering occurs.

A favourable combination of low density, sufficient strength and ductility, as well as an attractive wood-like appearance can be achieved if the wood meal fibres have a mass fraction of 20-40%, preferably of 25-35%, in particular 30%, and the adhesion promoter has a mass fraction of 1-5%, preferably of 2-4%, in particular 3%.

In order to further improve the mechanical properties despite low composite densities of below 0.1 g/cm$^3$, it can be provided that the matrix is a polymer blend of a polyolefin and at least one thermoplastic polymer, wherein the mass fraction of the at least one thermoplastic polymer is 5-50% of the polymer blend and wherein the at least one thermoplastic polymer has a melting temperature which is 20-70° C., preferably approx. 30° C. above the processing temperature of the polyolefin, and/or has a glass transition temperature which is up to 40° C. below the processing temperature of the polyolefin. As a result of these features, the strain hardening effect occurring during processing due to long-chain branching is further enhanced, while overall the melt flow rate remains sufficient for favourable processing conditions.

In this context, it is recommended if the at least one thermoplastic polymer is a thermoplastic polycondensate. Preferably, the polycondensate can be a polyamide and/or a thermoplastic polyester. Particularly preferably, the polycondensate may be a polyamide 6, a polycarbonate, a polyethylene terephthalate and/or a polybutylene terephthalate.

The invention also relates to a method for producing a wood-plastic composite material according to the invention via a two-stage screw extrusion process. In this process, in a first step, the matrix melt, the wood meal fibres and the adhesion promoter, which is preferably based on maleic anhydride, are first mixed to form a composite melt. Subsequently, in a second step, the composite melt is homogenised and extruded at a melt temperature between 170 and 200° C. and at a mass throughput of 5 to 15 kg/hour, wherein a blowing agent is supplied to the composite melt via a gas metering device before the extruder mixing zone. The step of producing the composite melt and introducing the blowing agent can also be carried out in one process step. The extruder mixing zone is understood to be that extruder section which is associated with any mixing part of the extruder screw. Accordingly, the blowing agent is fed to the melt in the extruder section that is upstream of the mixing section in the conveying direction with respect to the longitudinal axis.

A wood-plastic composite material according to the invention is suitable as a material for structural components of a transport pallet, which can be based on the Europool standard in terms of its dimensions and design. For the production of transport pallets, the corresponding structural components made of a wood-plastic composite material according to the invention are at least partially nailed together, in particular with the aid of a compressed air nailer or an upsetting head nailer.

DETAILED DESCRIPTION OF THE PREFERRED EMBODIMENTS

Exemplary Embodiment 1

A wood-plastic composite material according to the invention comprises a long-chain branched polypropylene (WB140HMS) as matrix with a mass fraction of 67%, wood meal fibres (Lignocel C120) with a mass fraction of 30%, and an adhesion promoter (Scona TPPP 8112) with a mass fraction of 3%.

For example, a single-screw extruder (50 mm diameter) equipped with a core-progressive screw with an additional mixing section is used to produce the wood-plastic composite material. The melt is charged with the blowing gas carbon dioxide via a gas metering station, wherein the blowing gas is fed to the melt upstream of the mixing section with respect to the conveying direction. The melt temperatures along the screw are set in the range of 175 to 195° C., the melt throughput is about 10 kg/hour. The extrudate is extruded through a profile nozzle and subsequently cooled and drawn off.

The wood-plastic composite has a composite density of 0.06 g/cm$^3$. The modulus of elasticity was determined by means of an ISO 178 bending test at room temperature and a test speed of 1 mm/s and amounts to 800 MPa. The bending strength achieved is 16 MPa.

Exemplary Embodiment 2

A wood-plastic composite material according to the invention comprises a polymer blend as matrix with a mass fraction of 67%, wood meal fibres (Lignocel C120) with a mass fraction of 30%, and an adhesion promoter (Scona TPPE 5002 GALL) with a mass fraction of 3%. The polymer blend itself comprises a low-density polyethylene (PE-LD recyclate) with a mass fraction of 70% of the polymer blend and a polyamide 6 with a mass fraction of 30% of the polymer blend. The polyamide 6 used has a melting temperature of 215° C.

The production can be carried out in the same way as in the exemplary embodiment 1. At a processing temperature in the range of 175 to 195° C., the melting temperature of the polyamide 6 used is therefore 20 to 40° C. above the processing temperature.

The wood-plastic composite has a composite density of 0.08 g/cm$^3$. The modulus of elasticity was determined by means of an ISO 178 bending test at room temperature and a test speed of 1 mm/s and amounts to 620 MPa. The bending strength achieved is 7 MPa.

The invention claimed is:

1. A wood-plastic composite material for structural components of transport pallets that can be nailed together, said composite material comprising:

a matrix, wood meal fibers, and an adhesion promoter, wherein the matrix is foamed using a blowing agent;

wherein the matrix has a mass fraction of 60 to 79% of the composite material and comprises a polymer blend comprising a long-chain branched polyolefin and at least one other thermoplastic polymer selected from the group consisting of polyamide, polycarbonate, polyethylene terephthalate, and polybutylene terephthalate, wherein the long-chain branched polyolefin has long-chain branching such that at least 10% of side chains of the polyolefin have a chain length of at least 6 carbon atoms;

wherein the polymer blend comprises 5 to 50% of the at least one other thermoplastic polymer and a balance of the long-chain branched polyolefin;

wherein the wood meal fibers have a particle size of 70 to 150 μm and a mass fraction of 20 to 35% of the composite material;

wherein the adhesion promoter has a mass fraction of 1 to 5% of the composite material; and wherein the composite material has a density that is less than 0.1 g/cm$^{3.}$

2. The wood-plastic composite material according to claim 1, wherein the long-chain branched polyolefin is a polyethylene or a polypropylene.

3. The wood-plastic composite material according to claim 1, wherein the composite material has a modulus of elasticity of 500 to 1000 MPa.

4. The wood-plastic composite material according to claim 1, wherein the at least one other thermoplastic polymer is polyamide, and wherein the wood-plastic composite material is made by extrusion at a processing temperature that is 20-70° C. below a melting temperature of the at least one other thermoplastic polymer and/or that is no greater than 40° C. above a glass transition temperature of the at least one other thermoplastic polymer.

5. The wood-plastic composite material according to claim 4, wherein the at least one other thermoplastic polymer is a thermoplastic polycondensate.

6. A method for producing a wood-plastic composite material according to claim 1 using a two-stage screw extrusion process, said method comprising:

in a first step, mixing a matrix melt, the wood meal fibres and the adhesion promoter so as to form a composite melt; and then in a second step, homogenizing and extruding the composite melt at a melt temperature between 170 and 200° C. and at a mass throughput of 5 to 15 kg/hour;

wherein the method further comprises feeding a blowing agent to the composite melt upstream of an extruder mixing zone via a gas metering device.

7. A transport pallet comprising structural components made of a wood-plastic composite material according to claim 1, wherein the structural components are at least partially nailed together.

8. The wood-plastic composite material according to claim 2, wherein the at least one other thermoplastic polymer is polyamide, and wherein the wood-plastic composite material is made by extrusion at a processing temperature that is 20-70° C. below a melting temperature of the at least one other thermoplastic polymer and/or that is no greater than 40° C. above a glass transition temperature of the at least one other thermoplastic polymer.

9. The wood-plastic composite material according to claim 3, wherein the at least one other thermoplastic polymer is polyamide, and wherein the wood-plastic composite material is made by extrusion at a processing temperature that is 20-70° C. below a melting temperature of the at least one other thermoplastic polymer and/or that is no greater than 40° C. above a glass transition temperature of the at least one other thermoplastic polymer.

10. The wood-plastic composite material according to claim 8, wherein the at least one other thermoplastic polymer is a thermoplastic polycondensate.

11. The wood-plastic composite material according to claim 9, wherein the at least one other thermoplastic polymer is a thermoplastic polycondensate.

* * * * *